Figure 1:
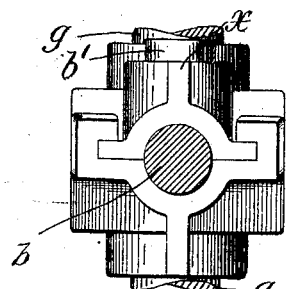

No. 838,157. PATENTED DEC. 11, 1906.
W. S. ATWOOD.
BRAKE ROD CONNECTION.
APPLICATION FILED SEPT. 29, 1906.

Witnesses
William Stephen Atwood
Inventor
By Attorney

UNITED STATES PATENT OFFICE.

WILLIAM STEPHEN ATWOOD, OF WESTMOUNT, QUEBEC, CANADA.

BRAKE-ROD CONNECTION.

No. 838,157.　　　Specification of Letters Patent.　　　Patented Dec. 11, 1906.

Application filed September 29, 1906. Serial No. 336,724.

*To all whom it may concern:*

Be it known that I, WILLIAM STEPHEN ATWOOD, of Westmount, in the district of Montreal, Province of Quebec, Canada, have invented certain new and useful Improvements in Brake-Rod Connections; and I do hereby declare that the following is a full, clear, and exact description of the same.

My invention has for its object to provide a device for connecting the brake-jaws to the rods, such brake-jaws not requiring to be worked to form the connection and the members whereof grip each other and the brake-rod uniformly over all contacting surfaces for the purpose of obtaining a perfectly rigid connection and uniform distribution of strains throughout the device.

To this end the invention may be said briefly to consist of a pair of jaw members, one of which has a male shank tapered in two directions and the other a female shank of corresponding formation and adapted to be fitted over and jammed upon the male shank, while one of the said jaw members has a lateral hole, and each has a concavity which conjointly constitute a straight sleeve adapted to inclose the rod, the end whereof is bent at right angles and inserted into the lateral hole.

For a full comprehension, however, of my invention reference must be had to the accompanying drawings, forming a part of this specification, in which similar reference characters indicate the same parts, and wherein—

Figure 2:
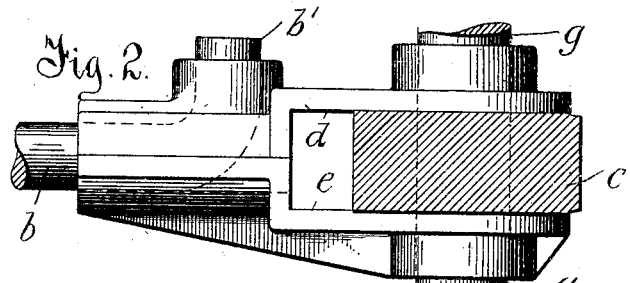
Figure 3:
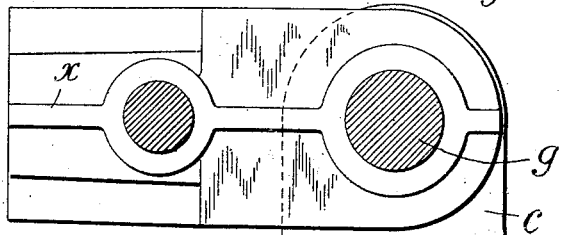
Figure 4:
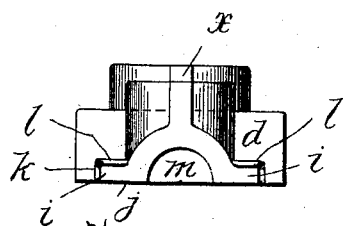
Figure 5:
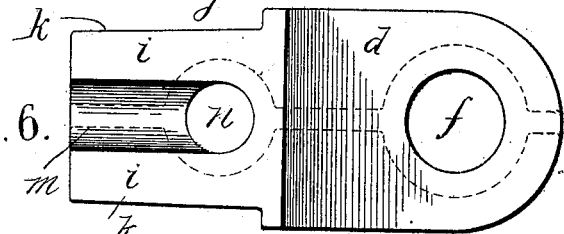
Figure 6:
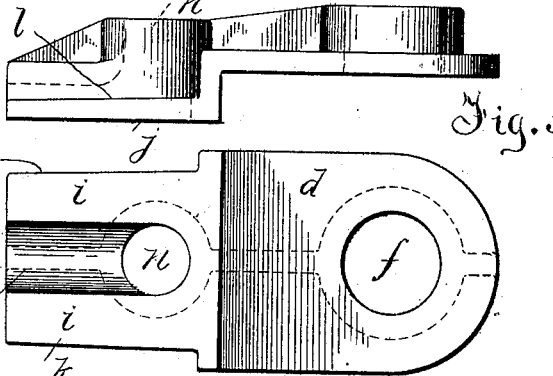
Figure 7:
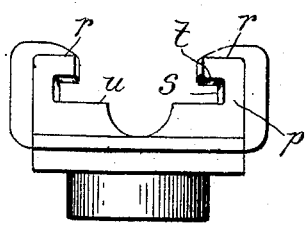
Figure 8:
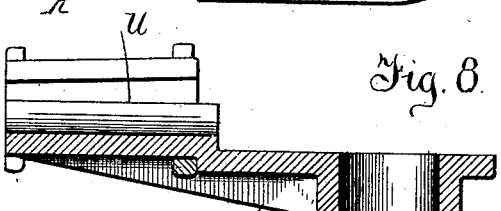
Figure 9:
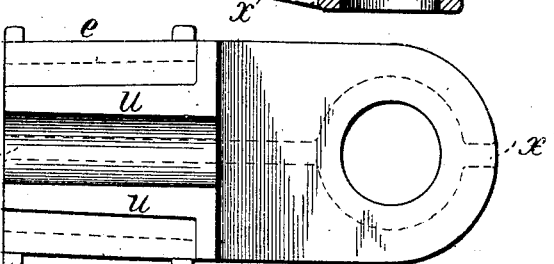

Figure 1 is an end elevation of the device with its members assembled and gripping the brake-rod. Fig. 2 is a side elevation thereof. Fig. 3 is a similar view to Fig. 2, taken at right angles thereto. Figs. 4, 5, and 6 are end and side elevations and inside face view, respectively, of the male member. Fig. 7 is an end elevation of the female member. Fig. 8 is a longitudinal sectional view thereof, and Fig. 9 is an inside face view of the female member.

It may be pointed out that the parts referred to as "brake-jaws" are those which connect the brake-rods $b$ with the levers, (a portion of one of which is indicated at $c$,) through which the brake-shoes are applied and released.

My improved jaws consist of male and female members presenting lugs perforated, as at $f$, to receive the brake-connection pin $g$, whereby the jaw is coupled to the lever $c$.

The male member is formed with a shank $d$ of semi-annular cross-section and provided with axial flanges $i$, diminished in thickness and width from the base of the shank to the end thereof, such diminishment in two directions being effected without disturbing the flat face $j$ by converging the opposite edges of the said flanges (as at $k$) and inclining the outer faces of these flanges, as at $l$. The concavity $m$ terminates at its inner end in a hole $n$, into which the bent end $b'$ of the brake-rod is fitted. The female member is also formed with a shank $e$ of semi-annular cross-section and having female axial flanges $p$, the internal surfaces $s$ and $t$ whereof are inclined correspondingly to the side edges $k$ and outer surfaces $l$ of the flanges $i\ i$, thus enabling the members to be jammed rigidly together, the female member fitting over the male member, while the surfaces $u$ within the female member are, like the corresponding faces $j$ of the male member, perfectly flat.

The perforated lugs are offset from the shanks to provide space for accommodating the lever end.

In assembling the members the end $b'$ of the brake-rod is first bent, preferably while cold, and the male member is placed thereon with the bent end $b'$ of the rod inserted into the hole $n$, while the portion of the rod contiguous to the bent end fits snugly into the concavity $m$. The female member is then forced over the tapered shank of the male member and driven home. The effect is that all the coinciding inclined faces of the members are caused to grip one another tightly, and the semicircular concavities tightly grip the rod, thereby insuring a uniform distribution of strains throughout the connection, which is facilitated by the strengthening-ribs $x$.

It is obvious that there are no parts to be worked to form the connection except the end of the rod, and it is bent, preferably, while cold.

Although I have illustrated and described my improved device as applied to the connection of brake-rods to the jaws, it can be used to advantage in other relations without departing from the spirit of my invention.

What I claim is as follows:

1. An article of manufacture comprising male and female members adapted to fit one over the other, the coinciding portions being tapered in two directions at right angles to each other, and means securing the opposite ends of the article thus constituted to parts to be connected together.

2. The combination with a rod, of male and female members each of semi-annular cross-section and provided with lateral flanges the flanges of the female member inclosing the side edges of the male member, the said side edges of the male member converging and the exposed faces of the said flanges being inclined; the internal surfaces of the female member being inclined correspondingly to the side edges and exposed surfaces of the male member; means for connecting the rod to the said members; and means whereby the said members are connected to a separate part.

3. The combination with a rod having one end bent at right angles, of male and female members each of semi-annular cross-section and provided with lateral flanges the flanges of the female member inclosing the side edges of the male member, the said side edges of the male member converging and the exposed faces of the said flanges being inclined; the internal surfaces of the female member being inclined correspondingly to the said side edges and exposed surfaces of the male member; the said male member having a hole at the inner end of its concavity to receive the bent end of the rod; and means whereby the said members are connected to a separate part.

4. The combination with a rod having one end bent at right angles, of male and female members each consisting of a shank with an offset lug and each shank being of semi-annular cross-section and provided with lateral flanges the flanges of the female member inclosing the side edges of the male member, the said side edges of the male member converging and the exposed faces of the said flanges being inclined; the internal surfaces of the female member being inclined correspondingly to the said side edges and exposed surfaces of the male member; the said male member having a hole at the inner end of its concavity to receive the bent end of the rod; and the said lugs being perforated.

In testimony whereof I have signed my name to this specification in the presence of two subscribing witnesses.

WILLIAM STEPHEN ATWOOD.

Witnesses:
WILLIAM P. McFEAT,
FRED. J. SEARS.